United States Patent [19]

Thedford

[11] Patent Number: 4,905,464

[45] Date of Patent: Mar. 6, 1990

[54] COTTON PICKER SPINDLE MOISTENING APPARATUS

[75] Inventor: Guy N. Thedford, Naperville, Ill.

[73] Assignee: J. I. Case Company, Racine, Wis.

[21] Appl. No.: 187,287

[22] Filed: Apr. 28, 1988

[51] Int. Cl.⁴ .................................... A01D 46/16
[52] U.S. Cl. ................................. 56/50; 56/41
[58] Field of Search .............. 56/28, 40, 41, 50, 33; 118/264, 266

[56] References Cited

U.S. PATENT DOCUMENTS

| | | | |
|---|---|---|---|
| 1,186,086 | 6/1916 | Finley | 401/207 |
| 1,697,761 | 1/1929 | Gleeson | 401/207 |
| 2,369,708 | 2/1945 | Baker et al. | 56/41 |
| 2,433,083 | 12/1947 | Baker et al. | 56/41 |
| 2,654,204 | 10/1953 | Grosevnor | 56/41 |
| 2,711,066 | 1/1955 | Barbknecht | 56/41 |
| 2,876,611 | 3/1959 | Hubbard | 56/41 |
| 2,884,754 | 5/1959 | Bornizin et al. | 56/41 |
| 3,004,376 | 10/1961 | Hubbard | 56/41 |
| 3,066,467 | 12/1962 | Barfield | 56/44 |
| 3,239,870 | 3/1966 | Douglas, Jr. et al. | 401/207 |
| 3,328,830 | 7/1967 | Corwin | 401/207 |
| 3,423,913 | 1/1969 | Mecklin | 56/41 |
| 4,078,865 | 3/1978 | Moser | 401/23 |
| 4,461,140 | 7/1984 | Carmi et al. | 56/50 |
| 4,611,941 | 9/1986 | Karliner et al. | 401/207 |
| 4,793,127 | 12/1988 | Sheldon, Jr. | 56/41 |
| 4,821,498 | 4/1989 | Deutsch et al. | 56/41 |

Primary Examiner—Thuy M. Bui
Assistant Examiner—Matthew Smith
Attorney, Agent, or Firm—Dressler, Goldsmith, Shore, Sutker & Milnamow, Ltd.

[57] ABSTRACT

A moistening apparatus for distributing moistening fluid to a plurality of vertically spaced axially extending spindles of a cotton harvesting machine includes a supporting standard arranged proximate the picker spindles. A series of moistening pads, communicable with a moistening fluid supply source, are attachable to the supporting standard one above the other in vertically spaced relation. Each moistening pad defines a top opening, a spindle wiping face disposed beneath the opening, opposed side edges spaced at different distances from the support standard, and a fluid distributing channel is configured. The fluid distributing channel has a series of fluid discharge ports. More discharge ports are provided toward one edge of the pad than the other. As such, more moistening fluid is applied toward the inner end of the picker spindles than is applied toward the distal end of the picker spindles.

16 Claims, 3 Drawing Sheets

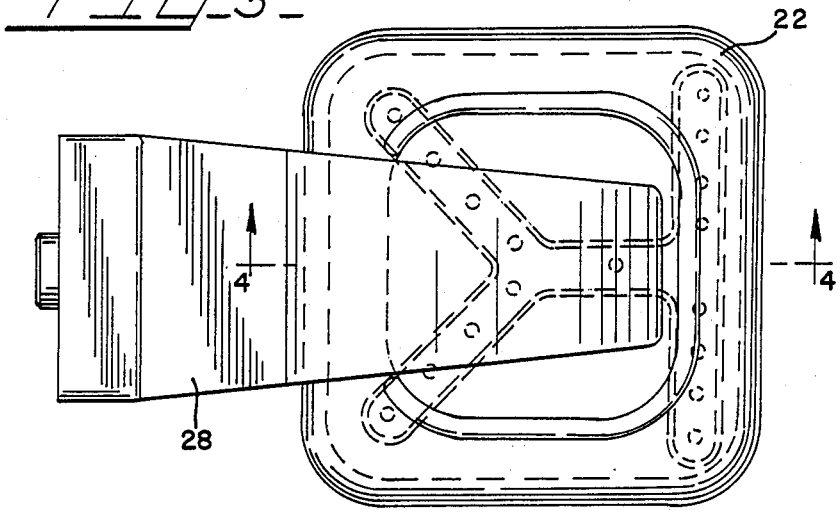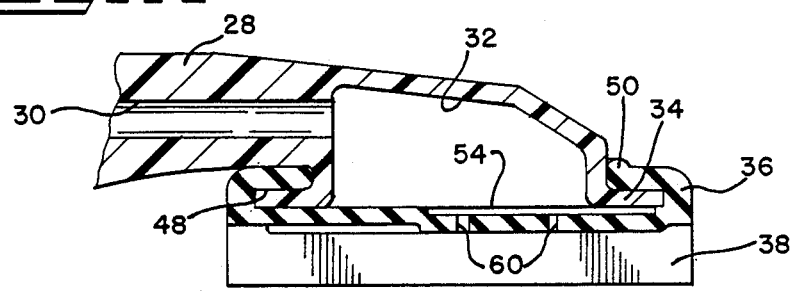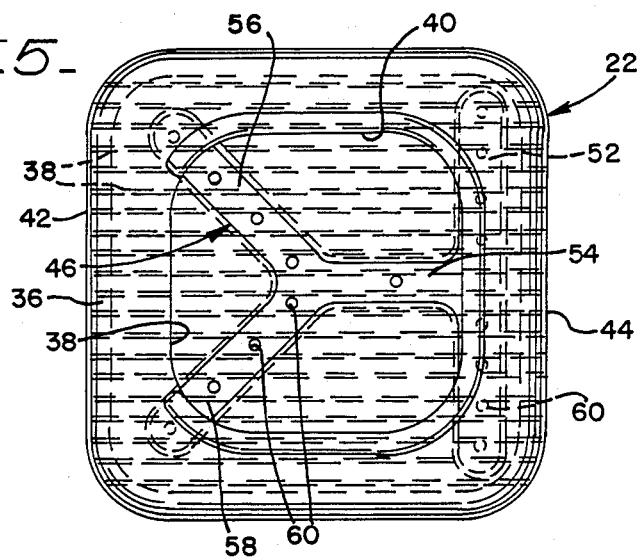

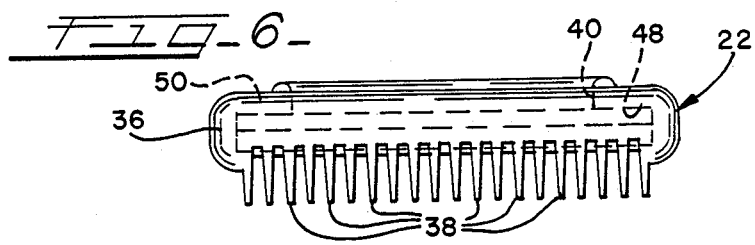
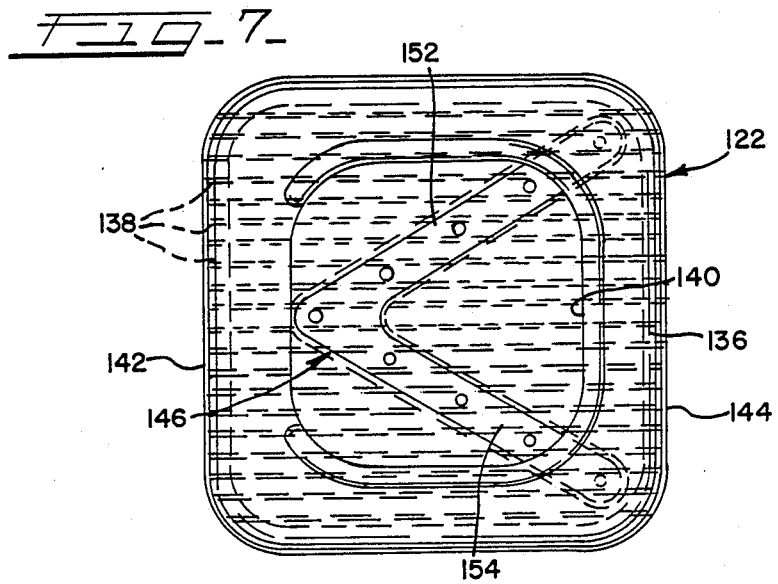
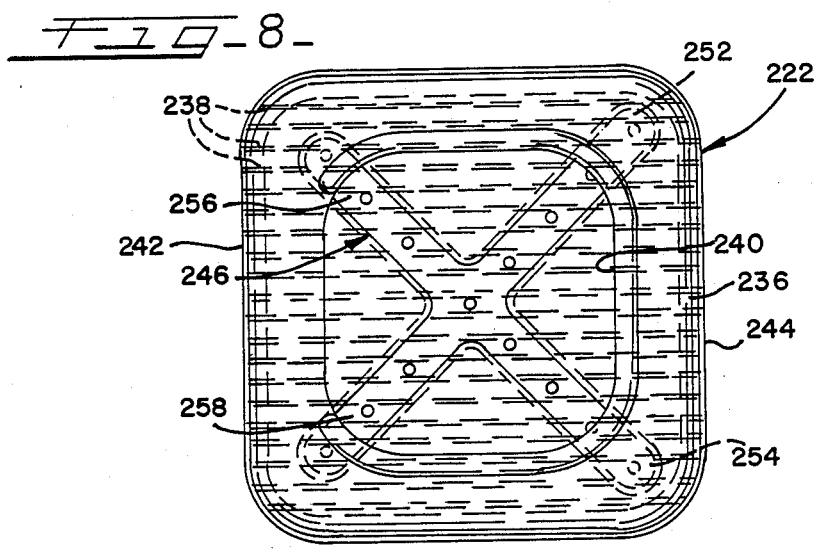

COTTON PICKER SPINDLE MOISTENING APPARATUS

TECHNICAL BACKGROUND

This invention relates to a fluid distributing apparatus and, more particularly, to an apparatus for applying a fluid to picking spindles of a cotton harvesting machine.

BACKGROUND OF THE INVENTION

A typical cotton picking or harvesting machine comprises a movable, downwardly tilted frame supporting one or more picking drums or units. The frame is tilted downwardly to prevent dirt from entering the housing at the rear of the unit.

Each picking unit includes a rotatable drum having a series of vertically spaced, free ended picking spindles projecting laterally therefrom. Some of the picking units must be close to the ground since cotton grows low on the cotton plants. Each picking spindle is rotatable on its own axis in addition to being carried through a horizontal orbit as a result of drum rotation. Moreover, each picking spindle is usually conical in shape with the free distal end thereof defining a small end and an inner or shield portion of the spindle defining a larger end. In some instances, the picking spindles are barbed or otherwise roughened on their periphery so as to enhance their affinity for cotton fibers.

To facilitate the cotton harvesting operation, it is conventional to supply a fluid in one form or another to each of the picking spindles prior to their entrance into the cotton plants. The primary function of the liquid deposited on the spindles is to cleanse the spindles of dirt, plant juices and other foreign matter which, if allowed to remain on the spindles, may consequently result in the buildup of a hard, rough coating surface that would diminish picking efficiency. Moistening the surface of the picker spindle onto which seed cotton is to be wrapped for extraction from the boll has been found to increase capacity of the picker spindles. The addition of moisture to the spindles further facilitates subsequent doffing or wiping operations of the cotton from the spindles.

Several different devices have been proposed for improving the delivery and application of a moistening fluid to the rotary cotton picking spindles. A typical cotton spindle moistening apparatus includes a column-like device having a vertically oriented series of moistening pads supported thereby. This column-like device is supported and carried by the downwardly angling frame of the cotton harvesting machine such that the moistening pads are arranged forward or in front of the spindle picking apparatus. The moistening pads are spaced apart on the order of the vertical spacing of the spindles so that each spindle passes below and receives moisture from an associated pad. Fluid may be individually supplied to the pads through a conduit system which communicates with a header. The header, in turn, is connected in fluid communication with a source of fluid supply.

It has been found that operation of the spindle moistener apparatus can be greatly improved if sufficient moistening fluid is distributed across the entire lateral length of the rotary picking spindles. The construction of the cotton picking machine, however, does not readily lend itself to accomplishment of such ends. As mentioned, the support column of the moistening apparatus is carried by the downwardly tilting frame. As a result, the support column is also tilted in a forwardly inclined fashion. Because the support column is tilted or inclined to the front moistening fluid supplied to the moistening pads has a tendency to move to the front of the pads. The circular rotation of the picking spindles also affects satisfactory distribution of the moistening fluid. That is, the circular rotation of the picker spindles induces centrifugal flow of the moistening fluid toward the free end of the spindle. Furthermore, the conical shape of the picking spindle, when combined with the rotational movement thereof, tends to cause the moistening fluid to move away from the larger or shield portion of the spindle toward the reduced free end of the spindle.

In view of the above, a problem results in that the largest amount of moistening fluid or water is concentrated at the spindle tip. In contrast, the inner or shield portion of the spindle is not provided with sufficient moistening fluid and, therefore, is not sufficiently wetted to facilitate the cotton harvesting operation.

SUMMARY OF THE INVENTION

In view of the foregoing, and in accordance with the present invention, there is provided a moistener apparatus for distributing moistening fluid to a plurality of vertically spaced, axially extending spindles of a cotton harvesting machine. The moistener apparatus of the present invention contemplates distributing disparate amounts of moistening fluid along the axial length of the picker spindle in a manner sufficiently wetting the entire length of the spindle to facilitate the cotton harvesting operation.

The apparatus of the present invention includes a supporting standard arranged proximate to the picker spindles. The standard supports a vertical series of substantially identical, individual moistening pads. The moistening pads are equal in number to the number of picker spindles on the cotton harvesting machine.

Each moistening pad is in fluid communication with a fluid supply source and is attachable to the supporting standard. Each pad defines a top opening, a spindle wiping face disposed beneath the opening, opposed edges arranged at different lateral distances from the support standard, and a fluid distributing channel. The spindle wiping face of each pad is defined by a plurality of downwardly extending, flexible, spaced apart fins. The channel is configured to open to the spindle wiping face such that more fluid is applied by the pad to the inner end of the picker spindle than is applied to the other end of the picker spindle.

The supporting standard preferably includes a plurality of vertically spaced, laterally extending, cantilevered arms. Each arm defines a fluid passageway for allowing fluid to pass to the pad associated therewith. The free end of each arm terminates in a laterally disposed flange. The flange is insertable into the top opening in the moistener pad. Each moistener pad is releasably secured to the flange such that the pad is restrained from disengagement with the flange.

In a preferred form of the invention, each moistener pad is substantially rectangular. The fluid distributing channel provided in each pad includes at least two interconnected branches extending angularly away from each other. Preferably, the fluid distributing channel extends across a central portion of the pad. Each branch of the channel includes a plurality of fluid discharge ports which open to the spindle wiping face of the pad.

More specifically, the fluid distributing ports open to the spacing between the depending fins on each pad. The fluid distributing ports are arranged in each channel to dispense less fluid to a distal end of the picker spindle than is dispensed to the opposite end thereof. To effect such ends, more fluid discharge ports are provided toward one edge of the pad than the other. By such configuration, the moistening pad provides additional moistening fluid at the inner or shield portion of the spindle to more evenly distribute the moistening fluid over the complete spindle.

Other features and advantages of the present invention will become readily apparent from the following detailed description, appended drawings and accompanying claims.

BRIEF DESCRIPTION OF THE DRAWINGS

FIG. 3 is a top plan view of moistening pad and a supporting arm therefor;

FIG. 4 is a vertical sectional view taken along line 4—4 of FIG. 3;

FIG. 5 is a top plan view of one form of a moistening pad;

FIG. 6 is a side view of the moistening pad illustrated in FIG. 5;

FIG. 7 is another embodiment of a moistening pad incorporating the principles of the present invention; and FIG. 8 is another embodiment of a moistening pad incorporating the teachings of the present invention.

DETAILED DESCRIPTION

Figure 1:
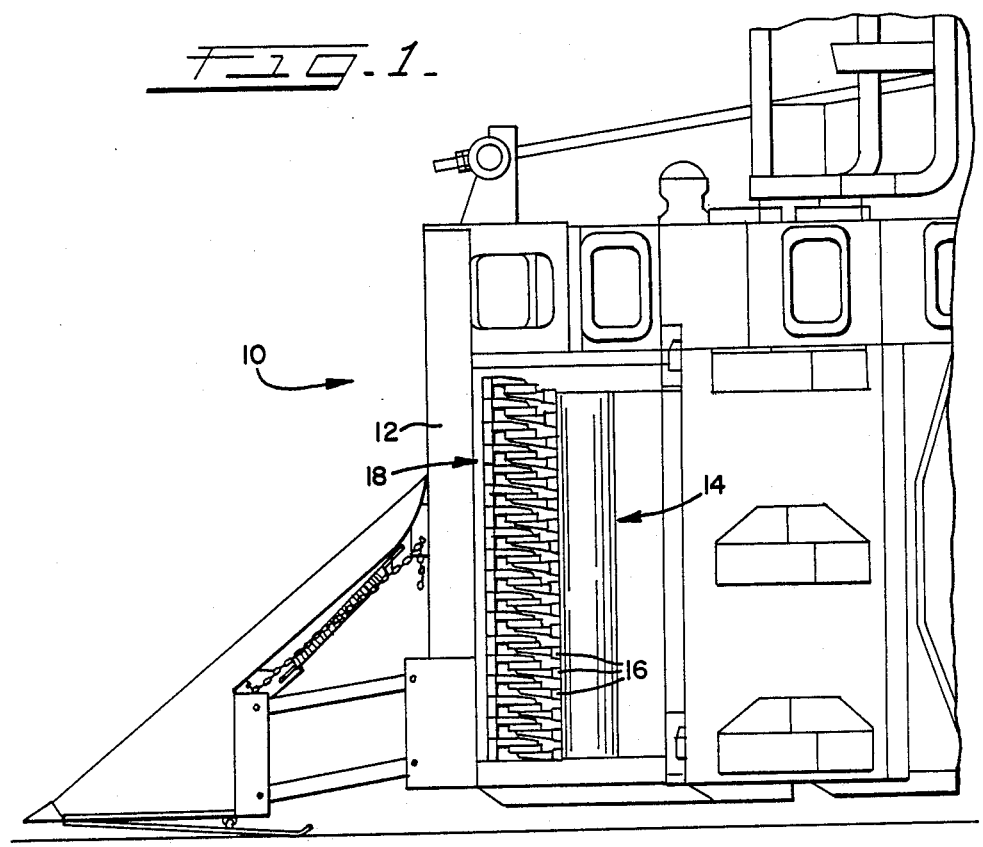
FIG. 1 is a fragmentary side view of a typical cotton picker machine.

While the present invention is susceptible of embodiments in various forms, there is shown in the drawings, and will hereinafter be described, presently preferred embodiments of the invention with the understanding that the present disclosure is to be considered as an exemplification of the invention, and is not intended to limit the invention to the specific embodiments illustrated.

Referring now to the drawings, wherein like reference numerals indicate like parts throughout the several views, there is shown a typical cotton picking machine 10. Machine 10 may be of the type shown in U.S. Pat. No. 2,259,894 to E. A. Johnston.

The cotton picking machine 10 comprises a movable, downwardly tilted frame 12 supporting one or more picker drums or units 14. Each picker drum includes a series of vertically spaced, axially extending spindles 16 arranged in vertical rows. As is conventional, each picker spindle is conically shaped with its larger inner end being secured to the drum 14 and its smaller distal end extending away therefrom.

During operation of the cotton picking machine, these vertical rows of spindles are each rotated about their individual axes and move along a predetermined path of travel. In their predetermined path of travel, the spindles are swept laterally beneath and in wiping relation with a moistening apparatus 18 which distributes a moistening fluid to the picker spindles. After being moistened by the moistening apparatus, the picker spindles are swept laterally and projected into the cotton plant where their rotation about their individual axes facilitates their wrapping of the fibrous crop thereonto and extracting the same from the bolls. In a later cycle, the crop bearing spindles are withdrawn from the plant and carried into doffing relation with a doffer (not shown) which removes the cotton from the spindles. Thereafter, the spindles will be again presented to the moistening apparatus for remoistening preparatory to continuation of the operating cycle.

Figure 2:
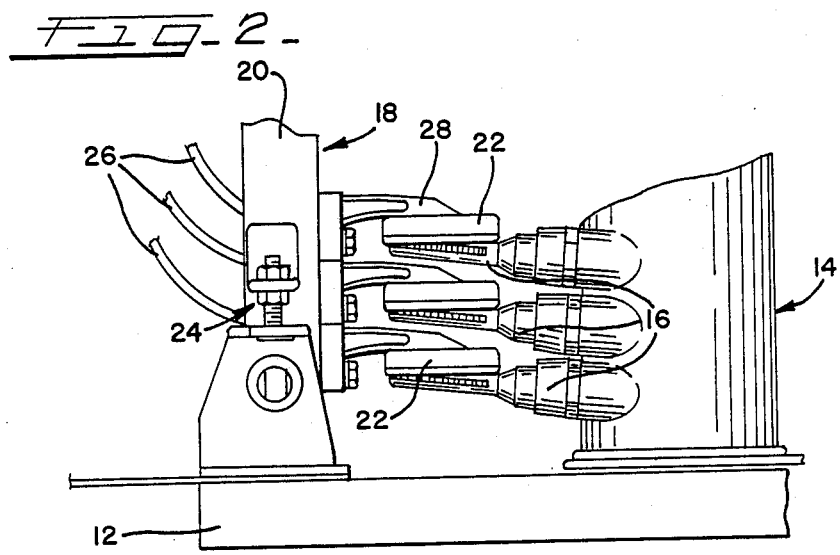
FIG. 2 is an enlarged fragmentary side view similar to FIG. 1 with parts broken away and illustrating a moistening assembly shown in association with picker spindles.

As best seen in FIG. 2, moistening apparatus 18 includes a vertical standard 20 secured to frame 12 of the machine in a position proximate to and preferably forward of the picker spindles 16. The vertical standard 20 supports a vertical series of substantially identical moistening pads 22 equal in number to the layers of spindles 16. The vertical standard 20 includes an adjustable apparatus 24 toward its lower end for adjusting the height of the standard 20 and thereby the vertical location of the moistening elements 22 relative to the path of the picker spindles 16. As will be understood, an adjustment in the height of the standard 20 will be necessary periodically to compensate for erosion of the moistening pads by the spindles 16.

At its other end, the support standard 20 is provided with a liquid feed apparatus or header unit (not shown) which is connected to a source of fluid supply. The header unit has a plurality of conduits or hoses 26 depending therefrom for delivering a predetermined amount of moistening fluid of a suitable character to each moistening pad 22.

As seen in the drawings, each moistening pad is supported in a substantially horizontal disposition at a free end of a cantilevered arm 28. the opposite end of arm 28 is suitably secured to support 20. As best seen in FIG. 4, each arm 28 defines a fluid passageway 30 which communicates with a hose 26 for delivering fluid to the moistening element 22. The free end of each arm 28 defines a cavity 32 into which passageway 30 opens. A horizontal flange or plate 34 radially extends away from the cavity 32 on all sides thereof.

As best seen in FIGS. 5 and 6, while any suitable type of pad may be employed in connection with the moistening apparatus, the illustrated pad 22 comprises a substantially rectangular body 36 from which there depends, as an integral part thereof, a series of thin, flexible, fin-like ribs 38 defining a spindle wiping face. Body 36 of the pad 22 defines a top opening 40, opposed edges 42, 44 and a fluid distributing channel 46. The opposed edges 42 and 44 are spaced at different lateral distances from the supporting standard 20, with edge 42 being disposed proximate to the distal end of the picker spindle and edge 44 being disposed proximate to the inner end of the picker spindle. Body 36 of pad 22 has a pocket 48 formed therein by an inwardly directed lip or flange 50 which is in spaced relation with the lower side of the body from which the ribs 38 depend. The body 36 of pad 22 is composed of rubber or other types of elastic material which permits the flange 50, since it is stretchable, to be distorted incident to the insertion of the horizontal flange 34 of arm 28 into the top opening 40 and pocket 48. Flange 34 on arm 28, which is also preferably rectangular, fits snugly into the pocket 48 such that pad 22 is restrained from disengagement with arm 28. The flange 34 is gripped with sufficient firmness by flange 50 to establish a sufficient seal therebetween for preventing the escape of fluid from the opening 40.

FIG. 5 illustrates one form of a moistener pad 22 configured with a fluid distributing channel 46 having branch portions 52 and 54 shaped in the form of "T". Branch portion 52 runs across the rear corners of the moistening pad fins along a line extending substantially parallel with back edge 44. The other branch portion 54 extends centrally of the pad body away from branch portion 52 and generally transverse to the direction of spindle movement. Branch portion 54 may terminate in a V-shaped configuration including interconnected branch portions 56 and 58. Branch portions 56 and 58 preferably angle away from a center section of the pad toward opposite corners.

Each branch portion 52, 54, 56 and 58 includes a plurality of ports or openings 60 defined by body 36. Each port or opening 60 opens and conveys moistening fluid to the spindle wiping face 38 from which the moistening fluid escapes via the fins to the cotton picking spindles 16 in the layer over which each pad is positioned. Preferably, the openings or ports 60 are provided such that they open between each fin.

As is evident from FIGS. 3 and 5, pad 22 is configured with more openings or ports 60 being provided toward edge 44 than are provided toward edge 42. The configuration of pad 22 allows more moistening fluid to be dispensed and applied toward the inner end of each picker spindle than toward the free end of each picker spindle.

Referring now to FIG. 7, therein is illustrated an alternative form of a moistener pad 122. In most respects, the details of pad 122 are identical to those in the previously described pad 22 and such like details are designated by the reference numerals in the one-hundred series.

Accordingly, moistening pad 122 comprises a substantially rectangular body 136 from which there depends, as an integral part thereof, a series of thin, flexible, fin-like ribs 138 defining a spindle wiping face. Body 136 defines a top opening 140, opposed edges 142, 144, and a fluid distributing channel 146. Pad 122 is secured to the support standard in the same manner as was pad 22. As with moistening pad 22, edge 142 of pad 122 is disposed proximate to the distal end of the picker spindle and edge 144 is disposed proximate to the inner end of the picker spindle.

Pad 122 is configured with a fluid distributing channel 146 which includes branch portions 152 and 154. Branch portions 152 and 154 are formed in body 136 as recessed channels which intersect with each other approximately mid-length of the pad 122 beneath opening 140. Branch portions 152 and 154 are fluidically interconnected at their apex and angularly extend away from each other toward the rear edge 144 of pad 122 along a path generally transverse to the direction of spindle movement.

Each branch portion includes a plurality of ports or openings 160 defined by the pad body 136. Each port or opening opens and conveys moistening fluid to the spindle wiping face 138 from which the fluid escapes via the fins to the cotton picking spindles in the layer over which the pad is positioned. Preferably, the openings or ports 160 open between each fin of the body. As is evident from FIG. 7, pad 122 is configured with more openings or ports provided toward edge 144 of pad 122 than are provided toward the other edge 142. As such, more moistening fluid will be dispensed from the pad 122 toward the inner end of each picker spindle than toward the free end of each picker spindle.

Referring now to FIG. 8, therein is illustrated an alternative form of a moistening pad 222. In most respects, the details of pad 222 are identical to those in the previously described pad 22 and such like details are designated by the reference numerals in the two-hundred series.

Accordingly, moistening pad 222 comprises a substantially rectangular body 236 from which there depends, as an integral part thereof, a series of thin, flexible, fin-like ribs 238 defining a spindle wiping face. Body 236 defines a top opening 240, opposed edges 242, 244, and a fluid distributing channel 246. As with moistening pads 22 and 122, edge 242 of pad 222 is disposed proximate to the distal end of the picker spindle and edge 244 is disposed proximate to the inner end of the picker spindle. Pad 222 is secured to the support standard in the same manner as was pad 22.

Pad 222 is configured with a fluid distributing channel 246 which includes branch portions 252, 254, 256 and 258. Branch portions 252 through 258 are formed in the body 236 as recessed channels which intersect generally in the center of the pad 222 beneath opening 240 to form an "X". Each branch extends from a center section or area of body 236 and angularly extends towards one corner of the body along a path generally transverse to the direction of spindle movement.

Each branch portion of channel 246 includes a plurality of ports or openings 260 defined by the body 236. Each port or opening 260 opens and conveys moistening fluid to the spindle wiping face 238 from which fluid escapes via the fins to the cotton picking spindles in the layer over which each pad is positioned.

Branch portions 252 and 254 are configured to extend toward the back edge 244 of the pad 222 a greater distance than the other two branch portions 256 and 258. As such, branch portions 252 and 254 include more openings or ports 260 than do the other two branch portions. By such construction, more moistening fluid is distributed toward the edge 244 of pad 222 than towards its other edge and, therefore, more moistening fluid is applied to the inner or shield end of the picker spindle than toward its distal end.

Whatever its form, the moistening pad is configured to apply more fluid toward the inner end of the spindle than is applied to the distal end of the spindle. This unequal application of moistening fluid allows the sweep action of the picker spindle across the spindle wiping face, the tilt of the picking unit, and the circular rotation of the picker bars to more evenly distribute the water over the complete axial length of the spindle. An additional advantage to the design of the present invention is the ability to retrofit previous machines for service. Moreover, the pad design contemplated by the present invention allows the pad to be mounted in either left-hand or right-hand positions in the picking unit with equal water distribution.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An apparatus for distributing a moistening fluid to a plurality of vertically spaced, axially extended picker spindles arranged to move along a predetermined path, each picker spindle including an inner end and a distal end, said moistening apparatus comprising:

a supporting standard arranged proximate to the picker spindles; and a vertical series of substantially identical, individual moistening pads equal in number to the number of picker spindles, means attaching each pad to said support standard and defining a passageway for allowing moistening fluid to pass to said pad, each pad defining a top opening, a spindle wiping face disposed beneath said opening against which a picker spindle passes while moving along its predetermined path, and a fluid distributing channel opening to said spindle wiping face and configured such that more moistening fluid is applied toward an inner end of said picker spindle than is applied toward its distal end.

2. The moistening apparatus of claim 1 wherein said supporting standard includes a plurality of vertically spaced, laterally extending, cantilevered arms, the free end of each arm terminating in a laterally disposed flange extendable into the top opening in said moistening pads.

3. The apparatus of claim 1 wherein each moistening pad is substantially rectangular and said fluid distributing channel crosses a central portion of said pad and has branches extending angularly toward corners of said pad.

4. An apparatus for moistening an axially extending, rotary cotton picking spindle having an inner end and a distal end, said moistening apparatus comprising a horizontally oriented pad connected to an upstruck support arranged proximate to said cotton picking spindle to dispense moistening fluid thereto, said pad having a rubber body presenting a spindle wiping face along one side thereof, said body defining horizontally extending fluid passage means which communicate with a spindle moistening fluid supply source, said passage means including a series of fluid discharge ports, with more ports opening to said spindle wiping face toward the inner end of the picker spindle than open to said spindle wiping face toward the other end of the picker spindle such that the dispensing of moistening fluid is greater at the inner end of the spindle than at the distal end of the spindle.

5. The moistening apparatus of claim 4 wherein said pad includes means for releasably securing said pad in an operative position on an extended arm of said upstruck support such that said pad is restrained from disengagement with said arm.

6. The moistening apparatus of claim 4 wherein said passage means comprises at least two fluidically interconnected branches.

7. The moistening apparatus of claim 6 wherein said pad is substantially rectangular and said branches cross at a generally central pad location and angle toward each corner of said pad.

8. The moistening apparatus of claim 7 wherein said pad has two pairs of diagonally opposed corners and wherein said passage means is configured with branches extending toward each of said corners, with the branches extending toward two of said corners extending horizontally across said pad a greater distance than the branches extending toward the remaining two of said corners.

9. The moistening apparatus of claim 4 wherein said passage means includes at least two fluidically interconnected branches angularly extending away from each other toward an edge of said pad.

10. A moistening assembly for a cotton harvesting unit having axially extending, vertically spaced rotary cotton picker spindles, each picker spindle having an inner end and a distal end, said moistening assembly comprising:

an upright support arranged proximate the picker spindles; and a series of moistening pads which fluidically communicate with a moistening fluid supply source and are attachable to the support one above the other in vertically spaced relation, wherein each of said pads defines a top opening for attaching said pad to said support, a spindle wiping face, and fluid passage means configured to dispense more moistening fluid toward an inner end of said picker spindle than is dispensed to a distal end of the spindle.

11. The moistening assembly of claim 10 wherein said upright support includes a plurality of vertically spaced laterally extending cantilevered arms, the free end of each arm terminating in a flange portion extendable into the top opening of said pad.

12. The moistening assembly of claim 10 wherein the pad is generally rectangular and said fluid passage means extend across a central area of said pad and extend toward the corners of said pad.

13. The moistening assembly of claim 10 wherein said fluid passage means includes at least two fluidically connected branches angularly extending away from each other at an acute angle toward one edge of said pad.

14. An apparatus for distributing a moistening fluid to a plurality of vertically spaced, axially extended picker spindles arranged to move along a predetermined path, each picker spindle including an inner end and a distal end, said moistening apparatus comprising:

a supporting standard arranged proximate to the picker spindles; and a vertical series of substantially identical, individual moistening pads equal in number to the number of picker spindles, means attaching each pad to said support standard and defining a passageway for allowing moistening fluid to pass to said pad, each pad defining a top opening, a spindle wiping face disposed beneath said opening against which a picker spindle passes while moving along its predetermined path, and a fluid distributing channel opening to said spindle wiping face such that more moistening fluid is applied toward an inner end of said picker spindle than is applied toward its distal end, said fluid distributing channel includes a series of ports, with more ports being provided in said pad toward one end of said spindle than are provided in said pad toward an opposite end of said spindle.

15. A moistening apparatus for distributing a moistening fluid to a plurality of vertically spaced, axially extended picker spindles arranged to move along a predetermined path, each picker spindle including an inner end and a distal end, said moistener apparatus comprising:

a supporting standard arranged proximate to the picker spindles; and a vertical series of substantially identical, individual moistening pads equal in number to the number of picker spindles, means attaching each pad to said support standard and defining a passageway for allowing moistening fluid to pass to said pad, each pad defining a top opening, a spindle wiping face disposed beneath said opening against which a picker spindle passes while moving along its predetermined path, a front edge arranged proximate to a distal end of a picker spindle, a rear edge arranged proximate to an inner end of a picker spindle, and a fluid distributing channel opening to said spindle wiping face such that more moistening fluid is applied toward an inner end of said picker spindle than is applied toward its distal end, wherein said fluid distributing channel includes at least two interconnected branches angularly extending away from each other at an acute angle toward said rear edge, with each branch of said channel having a plurality of apertures which open to the spindle wiping face to apply more moistening fluid toward the inner end of each spindle than toward the distal end of each spindle.

16. A moistening assembly for a cotton harvesting unit having axially extending, vertically spaced rotary cotton picker spindles, each picker spindle having an inner end and a distal end, said moistening assembly comprising:

an upright support arranged proximate the picker spindles; and a series of moistener pads which fluidically communicate with a moistening fluid supply source and are attachable to the support one above the other in vertically spaced relation, wherein each of said pads defines a top opening for attaching said pad to said support, a spindle wiping face, with one side edge of said pad being disposed closer to said upright support than is an opposed side edge, and fluid passage means opening to said spindle wiping face such that more moistening fluid is applied toward the inner end of said picker spindle than is applied to the distal end of a spindle, said fluid passage means including a series of fluid discharge ports opening to said spindle wiping face, with more ports being provided toward one edge of said pad than an opposed edge of said pad.

* * * * *